Figure 1:
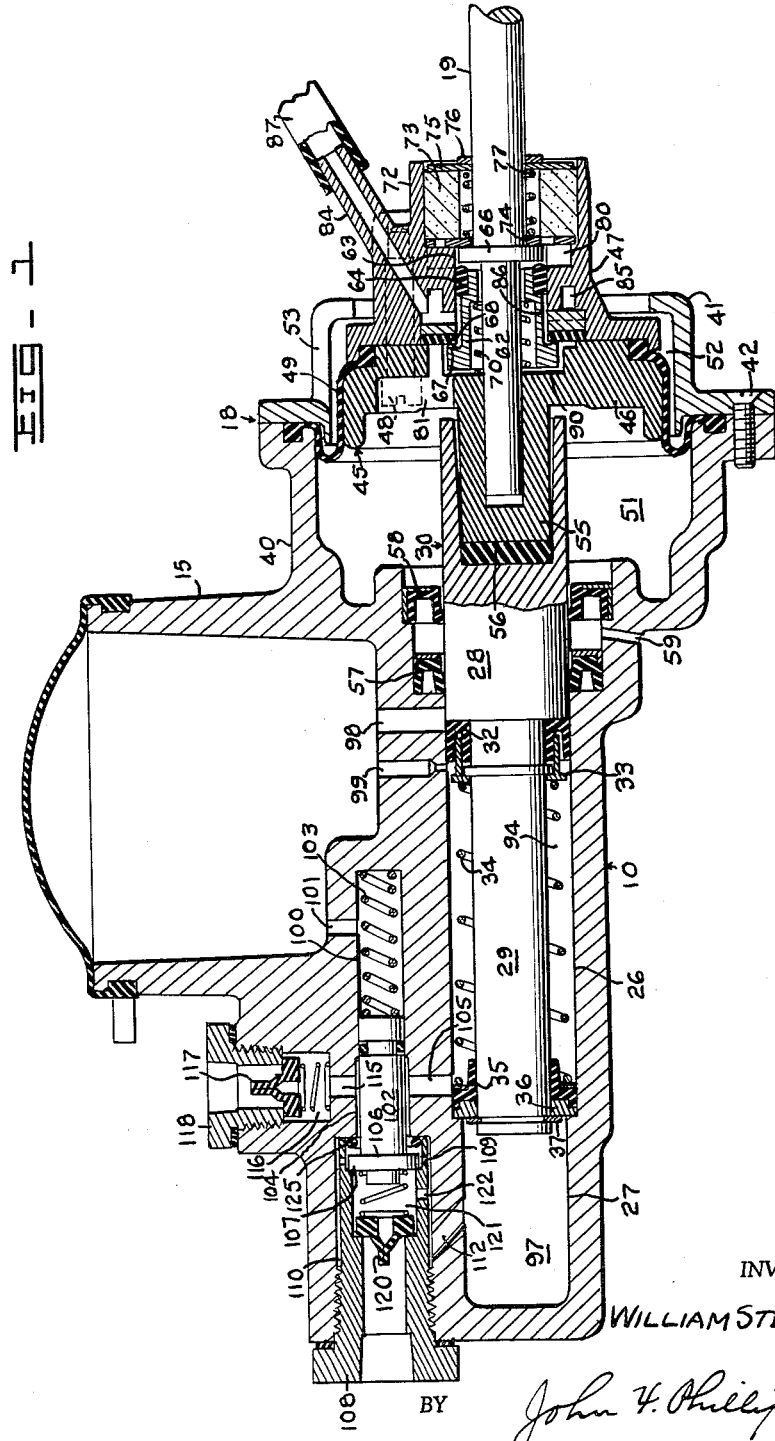

INVENTOR
WILLIAM STELZER
BY John F. Phillips
ATTORNEY

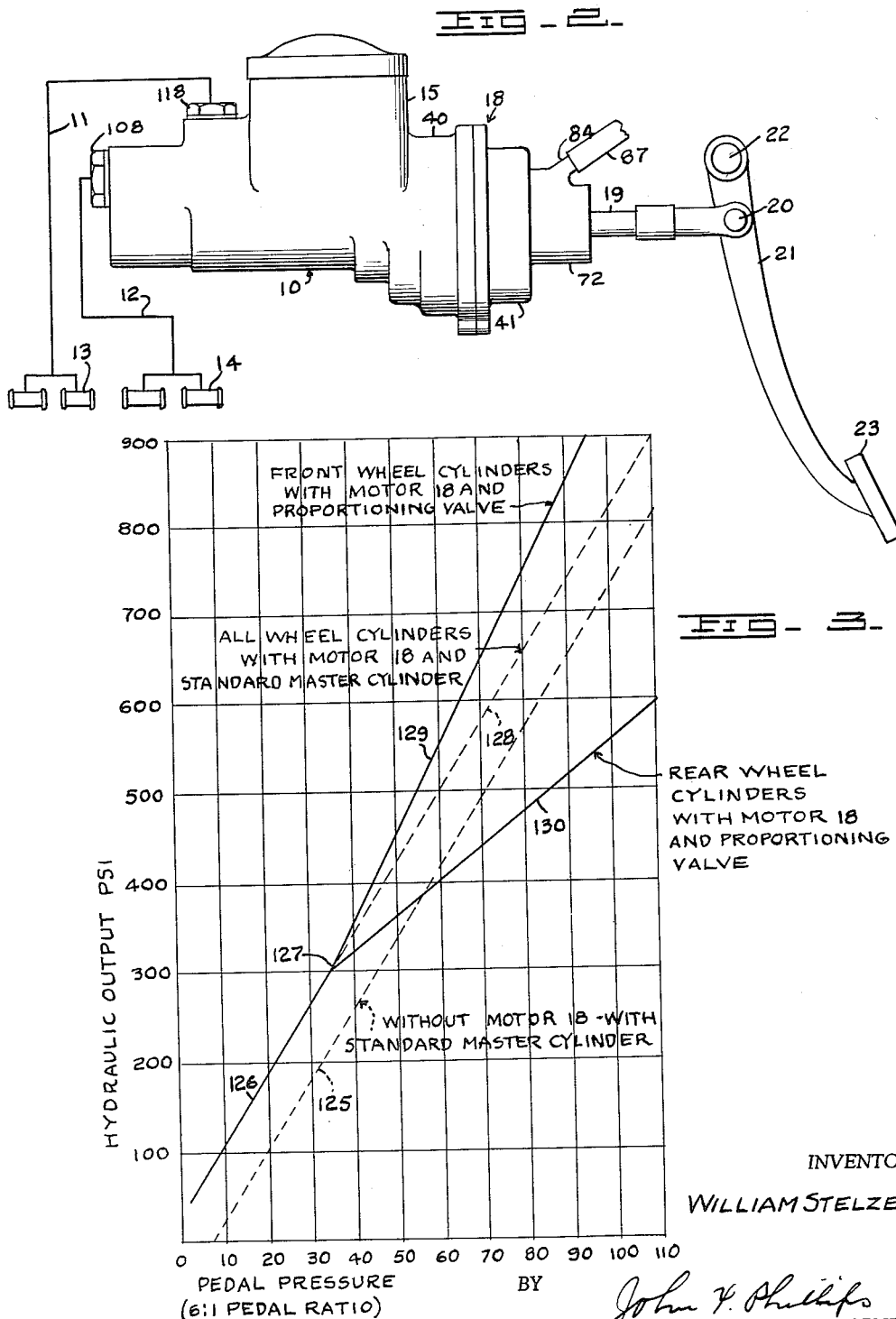

United States Patent Office 3,174,285
Patented Mar. 23, 1965

3,174,285
PRESSURE PRODUCING DEVICE FOR AUTOMOTIVE BRAKING SYSTEMS
William Stelzer, Bloomfield Hills, Mich., assignor to Kelsey-Hayes Company, Romulus, Mich., a corporation of Delaware
Filed June 12, 1963, Ser. No. 287,394
16 Claims. (Cl. 60—54.6)

This invention relates to pressure producing devices for automotive braking systems.

It is the common practice, as is well known, to provide motors operative upon movement of a motor vehicle brake pedal to generate pressure in the master cylinder to apply the brakes of a motor vehicle. Such types of mechanisms may be of the booster type wherein a fluid pressure operated booster motor and foot pressure on the brake pedal combine to generate the desired hydraulic braking pressure, or they may be of the type wherein very little movement of the brake pedal takes place to operate the motor valve mechanism, in which case, the motor performs all of the work to apply the brakes. In such mechanisms inherent resistance to movement of the master cylinder plunger, that is, resistances caused by the brake shoe return springs, the residual valve, and the master cylinder return spring, are of little importance since such resistances absorb relatively little of the power applied to the master cylinder plunger. In a conventional brake system wherein all of the work is performed by foot pressure on the brake pedal, the resistances referred to are of greater importance and absorb an appreciable percentage of the force applied to the brake pedal.

An important object of the present invention is to provide a novel pressure producing device for automotive brake systems wherein the braking pressures are generated by pedal forces, and wherein a highly simplified unmodulated motor is provided for the purpose of overcoming the resistances referred to and to expand the brake shoes until a brake torque is, or is about to be, produced, whereby substantially all of the foot power applied to the brake pedal is utilized for generating hydraulic pressures to apply the brakes.

A further object is to provide a simple and inexpensive partial power-assist to overcome the resistances referred to for the purpose stated, and wherein initial movement of the brake pedal fully energizes the motor to expand the brake shoes until a brake torque is, or is about to be, produced, immediately following which, forces applied to the brake pedal are utilized for building up pressures in the wheel cylinders.

A further object, as compared with booster or power brake systems, is to eliminate the need for the provision of means for imparting pedal reaction proportionate to the power applied, since the power of the small motor employed is limited and only overcomes the resistances referred to without producing appreciable brake torque, whereby master cylinder pressures are directly employed for reacting against the brake pedal in the same manner as is true in conventional non-power brake mechanisms.

A further object is to provide in combination with a mechanism of the type referred to a pressure proportioning means acting as a pressure intensifier for the front brakes and a pressure limiting means for the rear brakes, thus providing, with pedal pressure, the maximum needed pressure for the front wheel brakes and limited pressure for the rear wheel brakes, thus compensating for vehicle weight transfer occurring incident to brake torque and tending to prevent skidding or locking of the rear wheels.

A further object is to provide such a combination with the pressure proportioning means which acts, in effect, as a load compensating means to accomplish the results referred to and wherein the efficiency of the mechanism as a whole is increased by using such means in combination with a motor of limited capacity, as referred to above.

Other objects and advantages of the invention will become apparent during the course of the following description.

In the drawings I have shown one embodiment of the invention. In this showing

FIGURE 1 is an axial sectional view through the mechanism, the brake push rod being broken away;

FIGURE 2 is a side elevation of the mechanism including the brake pedal, the wheel cylinders and piping connections thereto being diagrammatically shown, and FIGURE 3 is a graph illustrating the relative effects of a standard conventional breaking system, the present system without the proportioning valve, and showing the division of pressures between the front and rear wheel cylinders with the apparatus used in conjunction with the proportioning valve means.

Referring to FIGURE 2, the numeral 10 designates a master cylinder as a whole having fluid lines 11 and 12 leading, respectively, to the front and rear wheel cylinders 13 and 14. The master cylinder 10 is provided with a reservoir 15 further referred to below.

A motor indicated as a whole by the numeral 18 is carried by the master cylinder and is described in detail below. The motor 18 is of the fluid pressure type, specifically in this case a vacuum motor of the atmosphere-suspended type, although any type of differential fluid pressure motor may be used, and the motor includes a valve mechanism operable by a push rod 19. This push rod is pivotally connected as at 20 to a brake pedal 21 pivotally supported at its upper end as at 22 and provided at its lower end with a pedal pad 23. The pedal may be provided with the usual leverage employed in conventional pedal-operated brake systems, the pedal ratio being, for example, 6:1.

Referring to FIGURE 1, the master cylinder 10 is provided with two bores 26 and 27 to respectively receive the stepped ends 28 and 29 of a master cylinder plunger 30. The left-hand end of the plunger portion 28 is sealed as at 32 in the bore 26. This seal is engaged and maintained in position by a spring seat 33 engaged by one end of a spring 34. The other end of this spring maintains in position a seal 35 through which the smaller plunger end 29 is axially movable. The seal 35 engages against a ring or washer 36. The left-hand side of the ring 36 is engaged by a snap ring 37 carried by the plunger end 29 to limit movement of the plunger 30 to the right to its off position shown in FIGURE 1.

The master cylinder casting is provided with a rearwardly extending housing 40 forming part of the housing for the motor 18, the other part of such housing being formed by a cap 41 fixed to the housing section 40 in any suitable manner, for example, by screws 42.

The motor 18 is provided with a pressure responsive unit indicated as a whole by the numeral 45 and comprising two body portions 46 and 47 clamped together, for example, by screws 48. The body member 46 may be a die casting, or it may be formed of a molded plastic, if desired. The inner bead of a rolling diaphragm 49 is clamped between the body members 46 and 47. The outer bead of the diaphragm 49 is clamped between the housing sections 40 and 41 and forms within the motor two chambers 51 and 52, the latter of which is open to the atmosphere through a slot 53 provided for a purpose to be described. Obviously, therefore, the right-hand side of the pressure responsive unit 45 is always open to the atmosphere, and the chamber 51 is normally open to the atmosphere through a valve mechanism to be described.

The body member 46 is provided with an axial extension 55 extending into the adjacent end of the plunger 30 and engaging a cushion 56 to transmit power therethrough to the plunger 30 to operate the latter when the pedal 21 is operated. The plunger portion 28 slides through spaced seals 57 and 58 carried by the body of the master cylinder to seal the chamber 51 from the master cylinder. The space between the seals 57 and 58 is open to the atmosphere for drainage, if necessary, as at 59.

A valve body 62 is slidable in the body member 47, the latter being provided with a bore 63 in which is slidable a combined valve and seal 64 carried by the valve body 62. The resilient member 64 extends slightly beyond the adjacent end of the valve body 62 to form a valve normally disengaged from but engageable with a flange 66 formed on the push rod 19. The other end of the valve body 62 is provided with a valve 67 engageable with a resilient valve seat 68 carried by the body member 47. The valve body 62 is biased to the right in FIGURE 1 by a spring 70 to tend to maintain the valve 67 in engagement with the seat 68.

The body member 47 is provided with a rearward axial sleeve portion 72 forming a housing to receive an air cleaning body 73 which is slightly axially compressible for a purpose to be described. One end of the air cleaner 73 engages an apertured washer 74, the other end of this air cleaner engaging a washer 75 which, in turn, engages a snap ring 76 carried by the push rod 19. A spring 77 within the air cleaner 73 engages the washer 75 to bias the push rod 19 to its normal off position shown, with the flange 66 disengaged from the resilient member 64.

To the right of the resilient member or valve 64 is formed an air chamber 80 in which atmospheric pressure is always present because of its communication with the atmosphere through the air cleaner 73. The chamber 80 communicates through the interior of the valve body 62 with a port 81, opening into the motor chamber 51.

The body 47 is provided with a preferably integral extending nipple 84 connected in any suitable manner to a source of vacuum, such as the intake manifold of the vehicle engine. The nipple 84 communicates with a vacuum chamber 85 which, in turn, communicates with an annular groove 86 formed around the valve body 62. This groove is sealed from the chamber 80 by the resilient member 64, and is normally disconnected from the motor chamber 51 because of the normal closing of the valve 67. Since the pressure responsive unit 45 is axially movable, the connection of the nipple 84 to the vacuum source includes a flexible hose section 87.

It will be noted that the left-hand end of the valve body 62 is slightly spaced from a shoulder 90 formed in the body member 46. Upon operation of the push rod 19, the flange 66 engages the resilient member 64 to close it to the atmosphere. This also moves the valve body 62 to the left to open the valve 67, as further described below. Within the limits of the space between member 46 and shoulder 90 the motor 18 will be fully energized, after which the extension 55 will effect movement of the master cylinder plunger 30, as fully described below.

The seals 32 and 36 form therebetween a primary hydraulic pressure chamber 94, while the bore 27 forms with the ring 36 a secondary pressure chamber 97. The reservoir is provided with the usual ports 98 and 99, the latter of which is a replenishing port for the chamber 94, and also for the chamber 97, in a manner to be described.

The proportioning mechanism is also illustrated in FIGURE 1. The body of the master cylinder is provided with a bore 100 open to the reservoir 15 as at 101. A plunger 102 is slidable in the bore 100 in sealed relation thereto and is biased to the left in FIGURE 1 by a spring 103. The left-hand end of the bore 100 is enlarged as at 104, thus providing a passage communicating through a port 105 with the chamber 94. The plunger 102 is provided with a flange 106 normally engaging under the force of the spring 103 with a shoulder 107 formed within a plug 108 threaded in the master cylinder body. The space to the right of the flange 106 normally communicates with the bore 104 and communicates through ports 109 with an annular passage 110 surrounding the inner portion of the plug 108. The passage 110 communicates with the secondary pressure chamber 97 through a passage 112.

The bore 104 communicates through a passage 115 with a chamber 116 in which is arranged a spring-pressed rubber residual pressure valve 117 engaging a plug 118 connected to the line 11 leading to the front wheel cylinders. The plug 108 is similarly provided with a rubber residual pressure valve 120, spring-pressed as shown. The chamber 121 to the right of the residual valve 120 communicates with the passage 110 through a port 122. It will be apparent that the left-hand end of the plug 108 communicates with the fluid line 12 leading to the rear wheel brake cylinders 14.

When the parts are in a normal off position shown, the compensating port 99 supplies whatever fluid may be necessary to the chamber 94. This chamber communicates through passages 105, 104, 109 and 112 with the secondary pressure chamber 97 so that fluid may be replenished in the latter chamber when the parts of the mechanism are in their normal off positions. With the apparatus shown, this normal communication between the chambers 94 and 97 is present during initial brake operation so that the same pressure will be communicated to the front and rear wheel cylinders 13 and 14 unless substantial brake application is desired. When pressure supplied from the chamber 121 to the rear wheel cylinders increases to a predetermined point, the plunger 102 will be moved to the right to engage the flange 106 with a resilient valve 125. Beyond such point, fluid will be supplied to the front and rear wheel cylinders separately from the respective chambers 94 and 97, as further referred to below.

*Operation*

Atmospheric pressure normally exists throughout the mechanism, including the hydraulic chambers and the motor chambers. The brakes are applied by depressing the pedal 23 and initial movement of the pedal moves the push rod 19 to the left against the light loading of the spring 77 to close the valve 64 and move the valve body 62 to the left to engage it with the body member 46. During this period, the motor 18 will be fully energized, without modulation. It will be noted that upon full energization of the motor 18, the pressure responsive unit 45 will transmit force through the extension 55 to move the plunger 30 against the loading of the spring 34, against the resistance of the residual pressure valves 117 and 120, and against the brake shoe return springs. With the push rod 19 continuing to move, the motor exerts sufficient force to overcome the inherent resistances referred to and to expand the brake shoes into engagement with the drums without effecting appreciable brake torque. Depending upon the brake installation, it requires a pressure of 80 to 100 p.s.i. to accomplish this result, and it is for the purpose of generating such limited pressures that the small motor 18 is provided.

Slight deformation of the member 64 engages the flange 66 against the adjacent end of the valve body 62, and this body thereupon becomes a force transmitting member to effect further movement of the plunger 30 and thus build up pressures in the chambers 94 and 97 to effect a brake torque in accordance with the force applied to the brake pedal. In booster motors or full power brake operating systems there is a modulated action of the valve mechanism, as is well known. There is no modulation in the present construction, the power of the motor providing assistance only to the extent that it overcomes the inherent resistances referred to above to position the brake shoes against the drums so that all of the pedal pressures are employed for developing brake torque producing pressures in the chambers 94 and 97. The member 64 not only acts as an air valve, but also as a seal between the groove 86 and chamber 80. Vacuum is always present in the groove 86 and upon the opening of the valve 67, the motor chamber 51 will be evacuated to its maximum extent to provide the motor with the predetermined maximum force necessary to overcome the inherent resistances referred to. The groove 53 provides for movement of the nipple 84.

The air cleaner 73 is readily axially compressible to the extent necessary for the operation of the push rod 19 to energize the motor in the manner described. The operation of the valve mechanism is dependent upon the compression of the pedal return spring 77 so that motor energization can take place only as long as the pedal is depressed.

The motor mechanism described is practicable for use with a conventional master cylinder, although the efficiency of the mechanism is increased by the use of the proportioning valve device illustrated. Assuming that a conventional master cylinder is used, progressively increasing pedal pressures, as shown in the graph in FIGURE 3, will provide a progressively increasing hydraulic pressure output, as indicated by the line 125 in FIGURE 3. The efficiency of the proportioning valve in combination with a manual brake system employing the motor 18, will become more apparent below.

Assuming that the proportioning valve is used, fluid will be displaced from the chambers 94 and 97 and equal pressures will be delivered to the front and rear wheel cylinders since the flange 106 (FIGURE 1) will be in its normal position to maintain communication between the chambers 94 and 97. During the period in which such normal communication is maintained, pedal pressures in relation to hydraulic pressure output will be as indicated by the line 126 in FIGURE 3, up to the point 127, to be described below, at which point the proportioning valve device comes into operation.

Referring to FIGURE 3, it will be clear that with the motor 18 overcoming inherent resistances and expanding the brake shoes as stated, the force applied to the brake pedal becomes more effective for generating braking pressures. For example, without the motor 18, a 20-pound pressure applied to the pedal with a 6:1 pedal ratio will develop approximately 100 pounds hydraulic pressure, while with the motor 18 in operation as described, a pedal pressure of 20 pounds will develop approximately 180 pounds hydraulic pressure, or nearly double the hydraulic pressures in the lower pedal pressure ranges. The line 126 will be parallel to the line 125 up to the point 127, and thus it will be apparent that the motor 18 renders a given pedal pressure effective for developing higher hydraulic output pressures.

It is highly desirable to utilize such increased hydraulic pressures up to the point where a given brake torque is developed, beyond which point it is desirable to increase front wheel braking pressures at an accelerated rate while rear wheel braking pressures are increased at a decelerated rate. The decelerated rate of pressure increase at the rear wheel cylinders is desirable to minimize the danger of the locking of the rear wheels. This has the effect of compensating for vehicle weight transfer occurring when brake torque increases to a predetermined point, as indicated above, this point being indicated as at 127 in FIGURE 3. Without the compensating valve and with the motor 18 operating, increased pedal pressures would result in uniformly increasing pressures in the front and rear wheel cylinders as indicated by the dotted line 128, forming an extension of the line 126 which will be parallel to the line 125. Under such conditions, it will be apparent that without the compensating valve, the hydraulic output pressure will exceed that which will be present without the use of the motor 18.

Assuming that the proportioning valve means is employed, when the pressure in the rear wheel cylinders increases to the point indicated at 127, pressure in the chamber 121 (FIGURE 1) will move the plunger 102 to the right to engage the flange 106 with the valve 125, and beyond such point, communication will be cut off between the hydraulic chambers 94 and 97. The greater output from the chamber 94 as compared with the chamber 97 will now cause front wheel hydraulic pressures to increase at an accelerated rate as indicated by the line 129 in FIGURE 3, while the lower output rate of the chamber 97 will cause rear wheel cylinder pressures to continue to increase, but at a decelerated rate as indicated by the line 130. It will be apparent that with the present mechanism, higher total braking pressures may be obtained with less pedal effort.

When the brake pedal is released, movement of the push rod 19 to the right relieves master cylinder pressures since the motor 18 is not of sufficient power to maintain these pressures. Progressive releasing of the push rod 19, therefore, is accompanied by movement of the pressure responsive unit 45 to the right, and as this movement takes place, pressures in the front and rear wheel cylinders will be progressively relieved, as respectively indicated by the lines 129 and 130 (FIGURE 3), until the point 127 is reached. At this point, the spring 103 will move the plunger 102 to open the valve 106. Accordingly, below the point 127, wheel cylinder pressures will be balanced and will decrease, as indicated by the line 126. Accordingly, pressure decreases in the wheel cylinders will occur along the same lines as pressure increases during pedal operation. After retractile movement of the plunger 30 takes place, similar movement of the push rod 19 closes the valve 67 and opens the valve 64 to de-energize the motor.

From the foregoing, it will be apparent that the small, highly simplified type of motor 18 is very effective for providing only such power as is necessary to overcome inherent resistances in the brake system, such as the spring 34, the residual valve 117 and 120, and the conventional brake shoe return springs, and to expand the brake shoes until a brake torque is, or is about to be, produced. It is therefore unnecessary for the operator to expend a part of the pedal pressure forces in overcoming these resistances, and pedal forces are utilized entirely for generating hydraulic braking pressures. While the motor 18 is usable with a conventional master cylinder, the effectiveness of the manual braking throughout the entire braking range is increased by the use of the proportioning valve mechanism in the manner described. The mechanism makes it unnecessary to provide in the motor some means for reacting against the brake pedal in proportion to motor energization or proportional to hydraulic pressure generated in the master cylinder. When a certain pressure is reached, for example, 300 p.s.i., as indicated in FIGURE 3, the spring 103 yields to render the proportioning valve device operative. In the lower brake operating stages, that is, up to the point 127, pedal reaction is similar to that in a system using a conventional power booster unit, the reaction being direct from the hydraulic master cylinder chambers acting against the plunger 30. In severe stops, an additional boost is obtained by the compound action of the master cylinder plunger to compensate for vehicle weight transfer under such braking conditions, thereby reducing the possibility of rear wheel skid and providing better stability and greater vehicle deceleration.

It is to be understood that the form of the invention shown and described is to be taken as a preferred example of the same and that various changes in the shape, size, and arrangement of the parts may be made as do not depart from the spirit of the invention or the scope of the appended claims.

I claim:
1. In a hydraulic braking system for a vehicle having brakes and wheel cylinders to apply the brakes, a master cylinder including piston means to transmit fluid under pressure to the wheel cylinders, pedal operated means to move said piston means, said pedal operated means being spaced relative to said piston means to afford a small movement of said pedal operated means before engaging said piston means, a fluid operated motor mechanism of predetermined limited power arranged to act on said piston means to transmit fluid from said master cylinder to the wheel cylinders under a predetermined pressure so limited as only to substantially overcome the initial resistance of the brakes before a brake torque is produced, a source of fluid pressure, valve means connected to said source of fluid pressure and to said motor mechanism to control the power of said motor mechanism, and means responsive to said small movement of said pedal operated means to actuate said valve means to thereby fully energize said motor mechanism, whereby the full power of said motor mechanism is applied to produce hydraulic pressure in said master cylinder before manual power is transmitted to said master cylinder augmenting the hydraulic pressure produced by said motor mechanism.

2. In a hydraulic braking system for a vehicle having brakes and wheel cylinders to apply the brakes, a master cylinder including piston means to transmit fluid under pressure to the wheel cylinders, pedal operated means for moving said piston means, a fluid operated motor mechanism having a pressure responsive unit normally engaging said piston means, a valve mechanism for said motor including an axially movable member movable by said pedal operable push rod upon movement thereof a slight distance from a normal position to fully energize said motor mechanism, said motor mechanism having predetermined power so limited as only to substantially overcome the initial resistance of the brake system before a brake torque is produced, said axially movable member being arranged to partake of a small movement during which said motor is fully actuated and beyond which said axially movable member engages said pressure responsive unit whereby, after the full power of said motor mechanism is applied to produce hydraulic pressure in said master cylinder, manual power is transmitted through said pressure responsive unit to said master cylinder to augment the hydraulic pressure produced by said motor mechanism.

3. A system according to claim 2 wherein said axially movable member of said valve mechanism is a valve body provided at one end with a normally open high-pressure valve and at its other end with a normally closed low-pressure valve whereby said movement of said pedal operable push rod said slight distance from normal position moves said valve body to close said high-pressure valve and open said low-pressure valve, thus fully energizing said motor mechanism before transmitting pedal forces from said push rod to said piston means.

4. A system according to claim 3 wherein said pressure responsive unit is provided with a bore, said high-pressure valve is resilient and slides in said bore and forming a seal therein, said bore at opposite sides of said high-pressure valve communicating respectively with sources of high and low pressures, said low-pressure valve being carried by said axially movable member, connection of said motor mechanism with such pressure sources being controlled respectively by said high-pressure valve and said low-pressure valve.

5. A manually operable hydraulic pressure producing device for an automotive brake system having wheel cylinders, and chamber means and plunger means operable therein for displacing fluid to said wheel cylinders, the brake system possessing inherent resistances to displacement of fluid from said chamber means, comprising a fluid pressure motor connected to said plunger means, a valve mechanism for connecting said motor to a source of pressure, and a pedal operable push rod freely movable relative to said plunger means from a normal position a slight distance to fully energize said motor and then transmit direct pedal forces to said plunger means, said motor having a maximum power capacity when fully energized only approximately sufficient to overcome said inherent resistances before a brake torque is produced, whereby substantially all the force applied to said push rod is utilized for generating hydraulic braking pressures in said chamber means.

6. A manually operable hydraulic pressure producing device for an automotive brake system having wheel cylinders, and chamber means and plunger means operable therein for displacing fluid to said wheel cylinders, the brake system possessing inherent resistances to displacement of fluid from said chamber means, comprising a fluid pressure motor connected to said plunger means, a valve mechanism for connecting said motor to a source of pressure, and a pedal operable push rod engageable with said valve mechanism and freely movable from a normal position relative to said plunger means a slight distance to fully energize said motor, said valve mechanism including an element operative upon such movement of said push rod for establishing a mechanical connection for transmitting pedal forces to said plunger means, said motor having a maximum power capacity when fully energized only approximately sufficient to overcome said inherent resistances before a brake torque is produced, whereby substantially all the force applied to said push rod is utilized for generating hydraulic braking pressures in said chamber means.

7. A manually operable hydraulic pressure producing device for an automotive brake system having wheel cylinders, and chamber means and plunger means operable therein for displacing fluid to said wheel cylinders, the brake system possessing inherent resistances to displacement of fluid from said chamber means, comprising a fluid pressure motor having a pressure responsive unit mechanically engaging said plunger means, a valve mechanism for said motor, and a pedal operable push rod freely movable from a normal position relative to said plunger means a slight distance to fully energize said motor and for then transmitting direct pedal forces to said pressure responsive unit to actuate said plunger means, said motor having a maximum power capacity when fully energized only approximately sufficient to overcome said inherent resistances before a brake torque is produced, whereby substantially all the force applied to said push rod is utilized for generating hydraulic braking pressures in said chamber means.

8. A device according to claim 7 wherein said valve mechanism comprises an axially movable valve body normally slightly spaced from and engageable with said push rod and said pressure responsive unit to act as a force transmitting member between said push rod and said pressure responsive unit when said push rod is moved to energize said motor.

9. A manually operable hydraulic pressure producing device for an automotive brake system having wheel cylinders, and a master cylinder having chamber means therein and plunger means operable in said chamber means for displacing fluid to said wheel cylinders, the brake system possessing inherent resistances to displacement of fluid from said chamber means, comprising a fluid pressure motor carried by said master cylinder and having a pressure responsive unit connected to said plunger means, a valve mechanism for connecting said motor to a source of pressure, said valve mechanism comprising an axially movable valve body normally slightly spaced at one end from said pressure responsive unit, and a pedal operable push rod having a portion normally slightly spaced from the other end of said valve body and movable from a normal position a slight distance to fully energize said motor and to then transmit direct pedal forces through said valve body to said pressure responsive unit to operate said plunger means, said motor having a maximum power capacity when fully energized only approximately sufficient to overcome said inherent resistances before a brake torque is produced, whereby substantially all the force applied from said push rod to said plunger means is utilized for generating hydraulic braking pressures in said chamber means.

10. A device according to claim 9 wherein said valve body is provided at one end with a resilient normally open high-pressure valve and at its other end with a normally closed low-pressure valve whereby movement of said push rod engages said portion thereof with said high-pressure valve and transmits movement to said valve body to open said low-pressure valve, thus fully energizing said motor before transmitting pedal forces from said push rod to said plunger means.

11. A device according to claim 9 wherein said pressure source is a vacuum source, said pressure responsive unit having an axial body provided with a bore open at one end to the atmosphere, a resilient air valve carried by the corresponding end of said valve body and sealing said bore and projecting slightly beyond said valve body and normally disengaged from said portion of said push rod, said motor at one side of said pressure responsive unit having a chamber, said valve body having an opening therethrough to normally connect said end of said bore to said chamber, a resilient valve seat carried by said pressure responsive unit, and a normally closed vacuum valve engaging said valve seat and disconnecting said chamber from said source of vacuum, whereby movement of said push rod engages said portion thereof with said air valve and then with said valve body to move the latter and to open said vacuum valve to evacuate air from said chamber.

12. A manually operable hydraulic pressure producing device for an automotive brake system having wheel cylinders, and a master cylinder having chamber means therein and plunger means operable in said chamber means for displacing fluid to said wheel cylinders, the brake system possessing inherent resistances to displacement of fluid from said chamber means, comprising a fluid pressure motor carried by said master cylinder and comprising a casing and a pressure responsive unit therein dividing said casing to form adjacent said master cylinder a variable pressure chamber, and forming at the other side of said pressure responsive unit a chamber open to the atmosphere, said pressure responsive unit comprising a rigid body and an annular rolling diaphragm connected between said body and said casing, said body engaging said plunger means, said body having a vacuum chamber connectible to a source of vacuum and an air chamber open through one end of said body to the atmosphere, a pedal operable push rod, a valve body, the body of said pressure responsive unit having a bore in which said valve body is slidable, an air valve carried by said valve body and sealing said bore between said vacuum and air chambers and projecting slightly beyond said valve body to be engaged by a portion of said push rod, said variable pressure chamber being normally open to the atmosphere around said air valve, and a vacuum valve normally closing said vacuum chamber to said variable pressure chamber, said valve body being slightly spaced at its ends from said body of said pressure responsive unit and said portion of said push rod, movement of said push rod closing said air valve and engaging said portion of said push rod with said valve body and engaging said valve body with said body of said pressure responsive unit while opening said vacuum valve to fully energize said motor, said motor having a maximum power capacity when fully energized only approximately sufficient to overcome said inherent resistances before a brake torque is produced, whereby substantially all the force applied from said push rod through said valve body and said body of said pressure responsive unit to said plunger means is utilized for generating hydraulic pressures in said chamber means.

13. A manually operable hydraulic pressure producing device for a automotive braking system having front and rear wheel cylinders, comprising a master cylinder provided with stepped bores, a plunger having a larger portion operable in the larger bore and a smaller portion operable in the smaller bore, connections between the relatively larger bore and the front wheel cylinders, connections between the smaller bore and the rear wheel cylinders to displace fluid from said bores to said wheel cylinders upon movement of said plunger, the brake system possessing inherent resistances to displacement of fluid from said bores, a fluid motor connected to said plunger, a valve mechanism for connecting said motor to a source of pressure, a pedal operable push rod movable from a normal position a slight distance to fully energize said motor and then transmit direct pedal forces to said plunger, said motor having a maximum power capacity when fully energized only approximately sufficient to overcome said inherent resistances before a brake torque is produced, whereby substantially all the force applied to said push rod is utilized for generating hydraulic braking pressures in said bores, said bores normally communicating with each other whereby pressures in said bores up to a predetermined point will develop equal pressures to all of said wheel cylinders, and means for closing communication between said bores when said predetermined pressure is reached in said smaller bore to thereafter accelerate the rate of pressure increase in hydraulic fluid to said front wheel cylinders and to decelerate the rate of pressure increase to said rear wheel cylinders.

14. A device according to claim 13 wherein said larger and smaller bores have separate ducts communicating with their associated wheel cylinders, passage means connecting said ducts and providing said normal communication between said bores, said means for closing communication between said bores comprising a control plunger having valve means associated therewith and having a relatively larger area subject to pressure in said smaller bore and a relatively smaller area subject to pressure in said larger bore, said control plunger being biased to an open valve position and movable to closed position when pressure in said smaller bore increases to said predetermined point.

15. A manually operable hydraulic pressure producing device for an automotive brake system having wheel cylinders, comprising a master cylinder having chamber means therein and plunger means operable in said chamber means for displacing fluid to said wheel cylinders, the brake system possessing inherent resistances to displacement of fluid from said chamber means, a fluid pressure motor carried by said master cylinder and comprising a casing having a pressure responsive unit connected to said plunger means and dividing said casing to form an atmospheric chamber and a variable pressure chamber, a valve mechanism normally connecting said variable pressure chamber to the atmosphere and having a valve body normally slightly spaced at one end from said pressure responsive unit and being axially movable to connect said variable pressure chamber to a source of vacuum, a pedal operable push rod, a spring biasing said push rod to a normal position slightly spaced from the other end of said valve body and movable against said spring a slight distance from normal position to move said valve body and fully energize said motor and then transmit pedal forces through said valve body to said pressure responsive unit to operate said plunger means, said motor having a maximum power capacity when fully energized only approximately sufficient to overcome said inherent resistances before a brake torque is produced, whereby substantially all the force applied from said push rod to said plunger means is utilized for generating hydraulic pressures in said chamber means.

16. A device according to claim 15 wherein said pressure responsive unit is provided with a bore, a seal slidable in said bore and carried by said valve body, one end of said bore communicating with said vacuum source, a valve carried by said valve body and normally disconnecting said end of said bore from said source, said seal projecting slightly beyond one end of said valve body to form an air valve, a flange carried by said push rod and engageable with said air valve to close communication between the atmosphere and said variable pressure chamber, said flange being engagable with said valve body to move the latter and transmit force to said plunger means.

References Cited in the file of this patent
UNITED STATES PATENTS

| | | |
|---|---|---|
| 2,735,268 | Stelzer | Feb. 21, 1956 |
| 2,886,950 | Hause | May 19, 1959 |
| 3,076,441 | Ayers | Feb. 5, 1963 |